(12) United States Patent
Suzuki

(10) Patent No.: US 9,470,880 B2
(45) Date of Patent: Oct. 18, 2016

(54) POSITION DETECTING APPARATUS, AND LENS APPARATUS AND OPTICAL OPERATING APPARATUS INCLUDING THE POSITION DETECTING APPARATUS

(71) Applicant: CANON KABUSHIKI KAISHA, Tokyo (JP)

(72) Inventor: Noboru Suzuki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 48 days.

(21) Appl. No.: 14/662,674

(22) Filed: Mar. 19, 2015

(65) Prior Publication Data

US 2015/0268068 A1  Sep. 24, 2015

(30) Foreign Application Priority Data

Mar. 20, 2014 (JP) .................................. 2014-057336

(51) Int. Cl.
*G01D 5/347* (2006.01)
*G02B 15/14* (2006.01)

(52) U.S. Cl.
CPC ........... *G02B 15/14* (2013.01); *G01D 5/34792* (2013.01)

(58) Field of Classification Search
CPC ................. G01D 5/34715; G01D 5/34776; G01D 5/34792; G02B 15/14
USPC ....................................................... 250/231.1
See application file for complete search history.

(56) References Cited

U.S. PATENT DOCUMENTS

2013/0116908 A1* 5/2013 Oh ........................ G01S 19/07
701/96
2015/0160427 A1* 6/2015 Miyashita .......... G01D 5/24471
359/826

FOREIGN PATENT DOCUMENTS

JP          545151 A      2/1993
JP    2005345375 A     12/2005

* cited by examiner

*Primary Examiner* — Seung C Sohn
(74) *Attorney, Agent, or Firm* — Rossi, Kimms & McDowell LLP

(57) ABSTRACT

A position detecting apparatus includes: a scale having pattern arrays having different cycles of a mover, a sensor detecting phase signals having different cycles based on the scale depending on a position of the mover; a signal processor generating and outputting displacement signals based on the phase signals by switching the displacement signals at a cycle; a detector detecting a speed of the mover based on at least one displacement signal; an absolute calculator deriving the position of the mover based on displacement signals; and a relative calculator deriving a displacement amount with respect to a predetermined position based on a selected displacement signal, wherein the position is calculated by the absolute calculator when the mover moves slow, and when the mover moves fast, the position of the mover is calculated based on an absolute position of the mover obtained in advance and the displacement amount the relative calculator obtained.

10 Claims, 9 Drawing Sheets

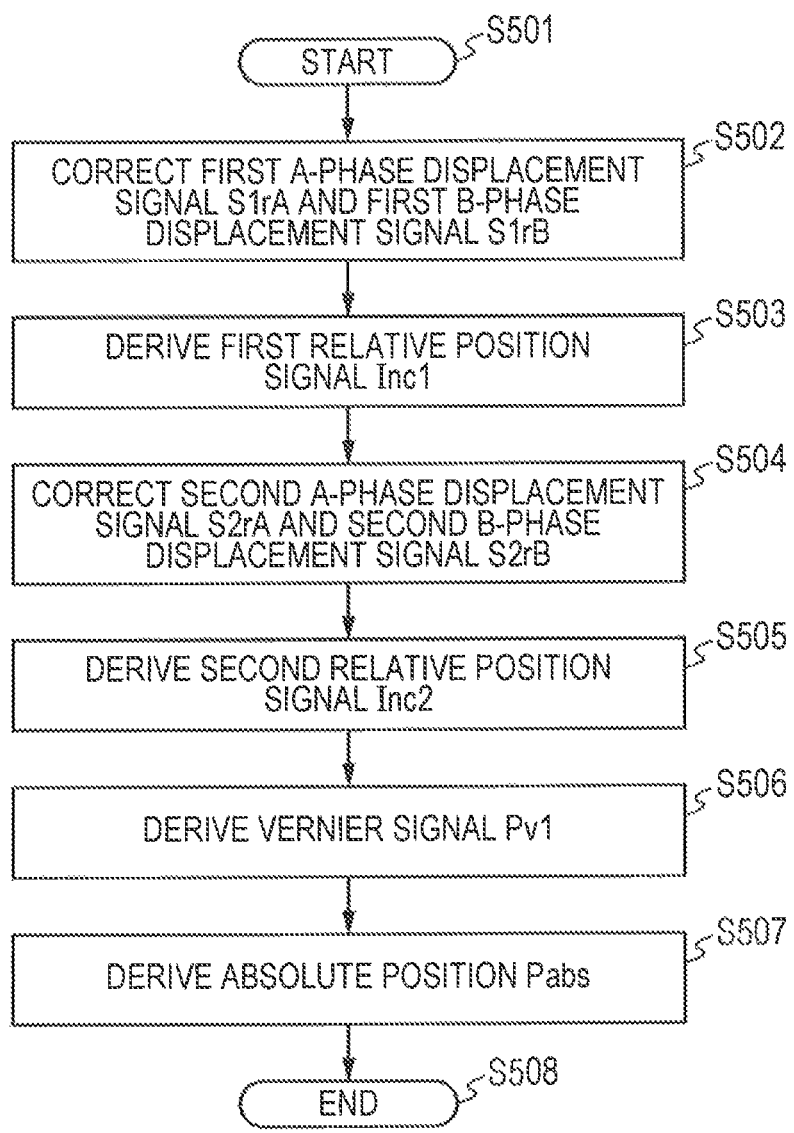

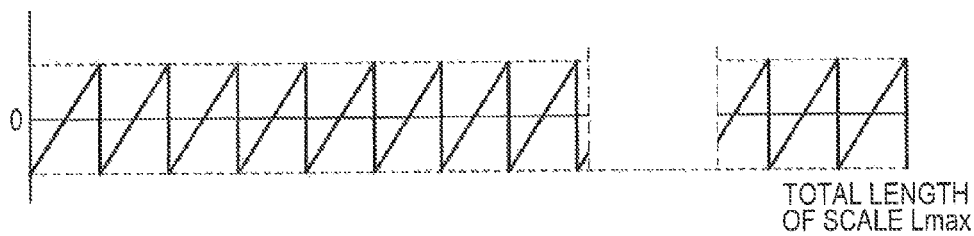
FIG. 6A  Atan1
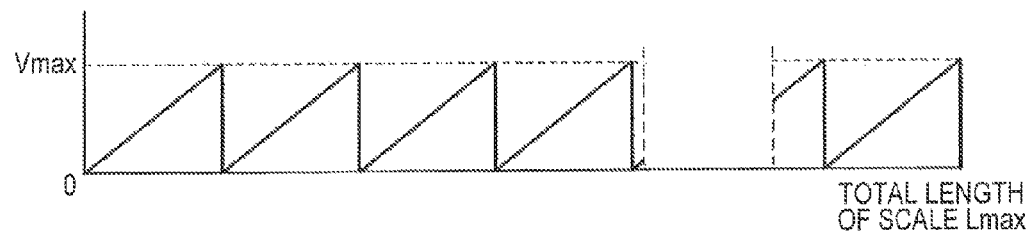
FIG. 6B  Inc1
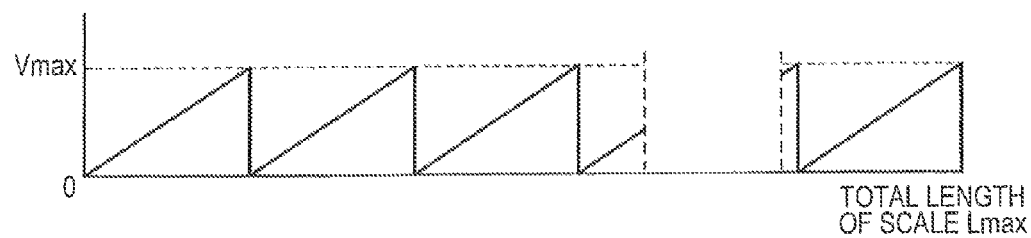
FIG. 6C  Inc2
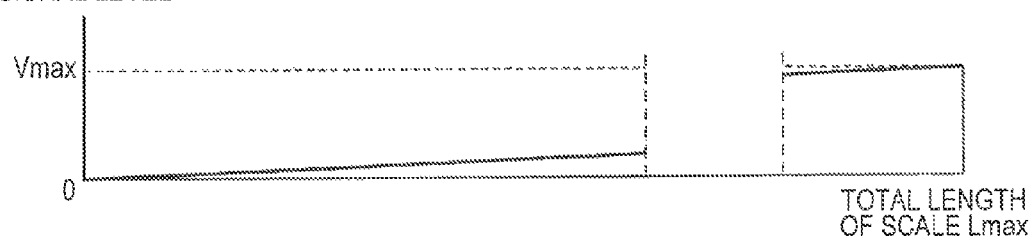
FIG. 6D  Pv1

POSITION DETECTING APPARATUS, AND LENS APPARATUS AND OPTICAL OPERATING APPARATUS INCLUDING THE POSITION DETECTING APPARATUS

BACKGROUND OF THE INVENTION

1. Field of the Invention

The present invention relates to a position detecting apparatus configured to detect a position of a moving member with respect to a fixed member. In particular, the present invention relates to a position detecting apparatus using both an absolute encoder and a relative encoder that use a sensor configured to output a plurality of phase signals while switching the plurality of phase signals in time series, and to a lens apparatus and an optical operating apparatus using the position detecting apparatus.

2. Description of the Related Art

In an optical apparatus and accessories thereof, there is an increasing demand for a function that allows use immediately after power-on in order to secure a photo opportunity. Further, an optical apparatus using a relative encoder in order to obtain positional information on a movable member of the apparatus needs to be initialized, and therefore cannot be used immediately after the power-on of the apparatus or consumes electric power for the initialization, which has increased the use of an absolute encoder. However, the absolute encoder necessitates more complicated calculation than the relative encoder does, and hence there is disclosed a technology for AD-converting a plurality of sensor outputs simultaneously in order to reduce a delay in the calculation. Further, there are disclosed a technology for detecting an abnormality due to a data retrieval error and a technology for realizing power saving or taking measures against a retrieval error by using a combination of the absolute encoder and the relative encoder.

In Japanese Patent Application Laid-Open No. H05-45151, there is disclosed a technology in which, because a slider of a digital caliper is in a stopped state for most of the time, an absolute counting unit is stopped and an incremental counting unit is operated when the slider is moving at a low speed or is stopped. In addition, when the slider is moving at high speed, the absolute counting unit is operated while the incremental counting unit is stopped.

In Japanese Patent Application Laid-Open No. 2005-345375, there is disclosed a technology in which an absolute position is obtained at power-on, and after that, incremental counting is conducted by only a minute scale, or an absolute value and a relative value are alternately obtained, to thereby increase reliability.

The absolute encoder necessitates more complicated calculation than the relative encoder does, and therefore can cause a problem in that processing is delayed when a lens, an operation unit, or the like moves at high speed. To cope therewith, it is necessary to increase a sampling frequency, mount a plurality of phase detection circuits in order to simultaneously process phase outputs of an encoder, and mount a high-performance CPU in order to execute complicated calculation processing at high speed. Therefore, there is a problem of causing an increase in current consumption and in cost. Further, there is another problem of causing an increase in the electric power and in cost due to providing of a calculation unit and a phase output unit for detecting an error in the absolute encoder. Further, in a case where a control subject moves at a remarkably high speed also in the processing of the relative encoder, a count error occurs when phase output signals corresponding to at least two cycles exist within a sampling cycle and hence, it is necessary to increase the sampling cycle.

On the other hand, in regard to a lens used for a camera, a zoom lens and a focus lens are rarely used for photographing in a fixed position, and are often moved in accordance with a photographic scene. Further, to move an optical system at high speed, it is not necessary to attain accuracy for a position of the optical system to be detected. For example, when the zoom lens needs to be moved at high speed, the zoom lens is used for transition of a scene (transition: shifting from a given scene to another scene), but is not used for the purpose of a picture (the shot image taken during the transition with high-speed zooming is not generally used for visual expression). To obtain focus by moving the focus lens at high speed, the picture is blurred while the focus lens is being moved to the vicinity of an in-focus position, which lowers importance as the picture. In contrast, the focus lens is moved at a low speed near the in-focus position in order to obtain focus with precision.

Further, the same applies to position detection of an operation unit such as a zoom demand or a focus demand during an operation of the operation unit.

SUMMARY OF THE INVENTION

The present invention has been made in view of the above-mentioned problems, and it is an object thereof to provide a position detecting apparatus configured as follows. That is, a present position is derived based on an absolute value during stop or low-speed movement, while the present position is derived based on relative value calculation during high-speed movement. With this configuration, it is possible to execute phase output processing for an encoder by using one phase detection circuit instead of using a plurality of phase detection circuits, avoid the need to increase a sampling frequency, suppress power consumption without the need to mount a high-performance CPU or the need for an error sensor unit, and detect the present position at low cost.

In order to achieve the above-mentioned object, according to one embodiment of the present invention, there is provided a position detecting apparatus which detects a position of a movable member with respect to a fixed member, having: a scale including a plurality of pattern arrays formed of cycles that differ from one another in a moving direction of the movable member; a sensor configured to detect a plurality of phase signals based on the scale depending on the position of the movable member with respect to the fixed member; a signal processor configured to generate a plurality of displacement signals based on the plurality of phase signals detected by the sensor and sequentially output the generated plurality of displacement signals by switching the plurality of displacement signals at a predetermined cycle; a speed detector configured to detect a moving speed of the movable member based on at least one of the plurality of displacement signals; an absolute position calculator configured to derive the position of the movable member based on at least two displacement signals among the plurality of displacement signals; and a relative position calculator configured to derive a displacement amount with respect to a predetermined position based on a selected displacement signal among the plurality of displacement signals. In the position detecting apparatus, the position calculated by the absolute position calculator is set as the position of the movable member when the moving speed of the movable member is lower than a first reference speed, and the position of the movable member is calculated based on the position of the movable member obtained by the absolute position calculator in advance and the displacement amount with respect to the position calculated by the relative position calculator when the moving speed of the movable member is equal to or higher than the first reference speed.

According to one embodiment of the present invention, in an optical apparatus mounted with an absolute encoder, by using absolute positional information and relative position information suitably in accordance with the moving speed, it is possible to construct a lens apparatus and an optical operating apparatus including a position detecting apparatus capable of suppressing erroneous detection with high precision while realizing low cost and power saving.

Further features of the present invention will become apparent from the following description of exemplary embodiments with reference to the attached drawings.

BRIEF DESCRIPTION OF THE DRAWINGS

FIG. 5 is a flowchart for deriving an absolute position.
FIG. 6A is a graph of an Atan 1 signal according to a first embodiment of the present invention.
FIG. 6B is a graph of a first relative position signal according to the first embodiment.
FIG. 6C is a graph of a second relative position signal according to the first embodiment.
FIG. 6D is a graph of a Vernier signal according to the first embodiment.

DESCRIPTION OF THE EMBODIMENTS

In the following, exemplary embodiments of the present invention are described in detail with reference to the accompanying drawings.

First Embodiment

Now, a position detecting apparatus according to a first embodiment of the present invention is described.

Figure 1:
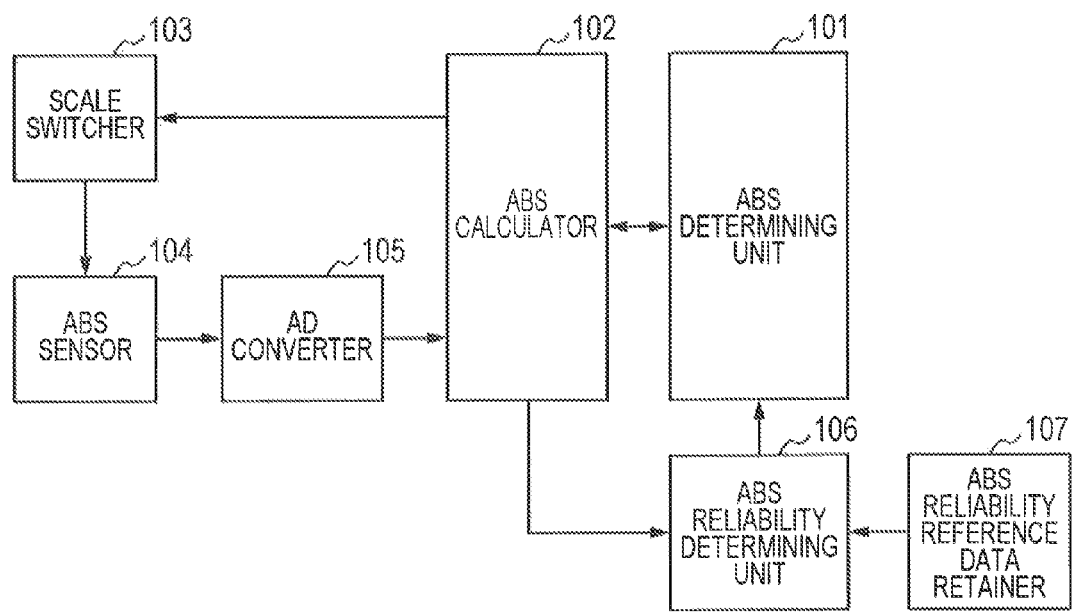
FIG. 1 is a configuration block diagram.

FIG. 1 is a configuration block diagram of the position detecting apparatus according to the first embodiment of the present invention. In FIG. 1, an ABS calculator 102 is a calculator (absolute position calculator) configured to derive an absolute position Pabs which is a displacement amount of a movable member with respect to a fixed member (that is, with respect to a predetermined reference position) based on a signal output from an ABS sensor 104. A scale switcher 103 is a scale switcher configured to switch two kinds of signal outputs generated based on two kinds of track patterns sequentially output from the ABS sensor 104. The ABS sensor 104 is an absolute position sensor configured to output a signal for deriving an absolute position of the movable member with respect to the fixed member. An internal configuration and the output signals of the ABS sensor 104 are described later. An AD converter 105 is an AD converter configured to convert an analog signal output from the ABS sensor 104 into a digital signal. An ABS reliability determining unit 106 is a reliability determination unit configured to determine a reliability of the absolute position derived by the ABS calculator. An ABS reliability reference data retainer 107 is a non-volatile memory configured to store and retain data for determining the reliability of the absolute position, and is, for example, an EEPROM. An ABS determining unit 101 is an absolute position determining unit configured to determine the absolute position Pabs derived by the ABS calculator 102 based on a determination result from the ABS reliability determining unit. The ABS determining unit 101, the ABS calculator 102, and the ABS reliability determining unit 106 are formed, for example, within one CPU. The position detecting apparatus according to this embodiment is formed of the ABS calculator 102, the scale switcher 103, the ABS sensor 104, the AD converter 105, the ABS determining unit 101, the ABS reliability determining unit 106, and the ABS reliability reference data retainer 107.

Next, an operation of this embodiment is described.

The ABS determining unit 101 requests the ABS calculator 102 to derive the absolute position Pabs. When receiving the request to derive the absolute position from the ABS determining unit 101, the ABS calculator 102 instructs the scale switcher 103 to sequentially output signals of two kinds of track patterns from the ABS sensor 104. The scale switcher 103 instructs the ABS sensor 104 to sequentially output the signals of the two kinds of track patterns. The ABS sensor 104 sequentially outputs the signals of the two kinds of track patterns in accordance with the instruction received from the scale switcher 103. The signals of the two kinds of track patterns output from the ABS sensor are converted into digital signals by the AD converter 105, and output to the ABS calculator 102. The ABS calculator derives the absolute position Pabs based on the signals of the two kinds of track patterns, and outputs the absolute position Pabs to the ABS determining unit 101. A method of deriving the absolute position is described later. Meanwhile, the ABS calculator 102 outputs absolute position deriving information to the ABS reliability determining unit 106. The ABS reliability determining unit 106 determines the reliability of the absolute position Pabs derived by the ABS calculator 102 based on the absolute position deriving information and reliability reference data retained by the ABS reliability reference data retainer 107, and outputs a result thereof to the ABS determining unit 101. The absolute position deriving information and the determination of the reliability of the absolute position are described later. Based on the determination result of the reliability of the absolute position Pabs output from the ABS reliability determining unit 106, the ABS determining unit 101 determines whether or not the absolute position Pabs derived by the ABS calculator 102 is to be determined, and when the absolute position Pabs is to be determined, the ABS determining unit 101 determines the absolute position derived by the ABS calculator 102. When the absolute position Pabs is not to be determined, the ABS determining unit 101 requests the ABS calculator 102 to again derive the absolute position Pabs. The ABS calculator 102 again derives the absolute position Pabs in response to the request received from the ABS determining unit 101. The above-mentioned processing is carried out on until the absolute position is determined.

Next, the internal configuration and the output signals of the ABS sensor 104 are described below.

Figure 2:
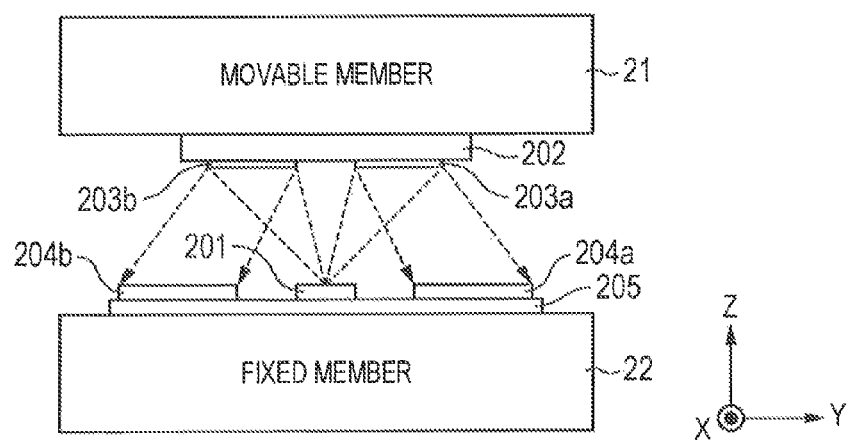
FIG. 2 is a sectional view of an ABS sensor.

FIG. 2 is a sectional view of the ABS sensor 104. In FIG. 2, a movable member 21 is a movable portion capable of moving in an X-axis direction which is vertical to a paper plane. A fixed member 22 is a member which serves as a reference of the absolute position of the movable member 21. A light source 201 is a light emitting unit, and is, for example, an LED. A scale unit 202 is a scale unit including two track patterns 203*a* and 203*b* having different numbers of slits arranged at equal intervals over a total length. A light receiver 204*a* is a light receiver configured to receive light which is emitted from the light source 201 and reflected by the track pattern 203*a*. Similarly, a light receiver 204*b* is a light receiver configured to receive light which is emitted from the light source 201 and reflected by the track pattern 203*b*. The light receivers 204*a* and 204*b* are, for example, photodiode arrays. A signal processing circuit (signal processor) 205 is a signal processing circuit configured to process the signals of the light received by the light receivers 204*a* and 204*b* and output any of the signals of the track patterns 203*a* and 203*b* in accordance with a switch-over signal from the scale switcher 103. In this embodiment, the configuration in which the scale unit 202 is mounted to the movable member 21 and the light source 201 and the light receivers 204*a* and 204*b* are mounted to the fixed member 22 is exemplified. However, the configuration is not limited thereto. The scale unit 202 only needs to be mounted to one of the fixed member 21 and the movable member 22, whereas the light source 201 and the light receivers 204*a* and 204*b* only need to be mounted to another of the fixed member 21 and the movable member 22. The same also applies to embodiments described later.

Figure 3:
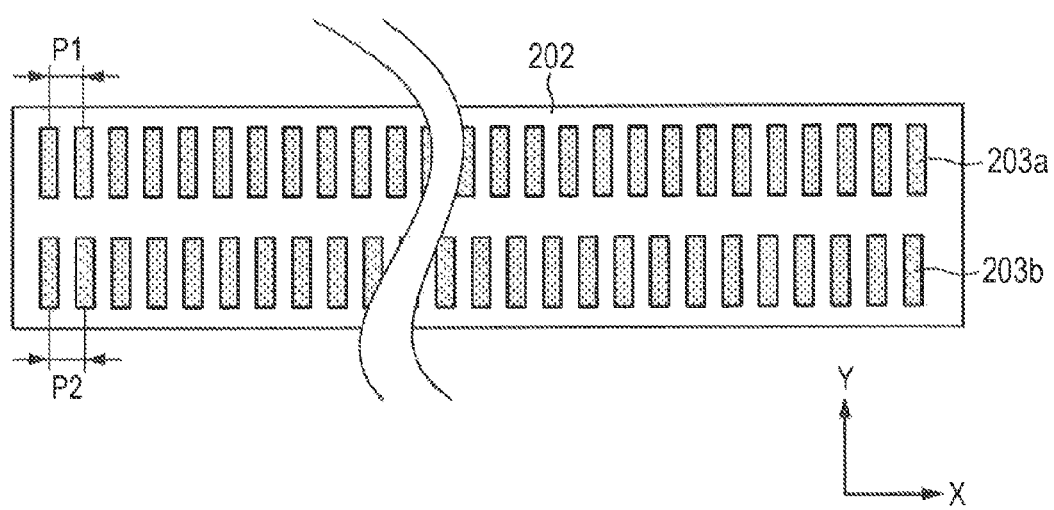
FIG. 3 is a plan view of a scale unit.

FIG. 3 is a plan view of the scale unit 202 according to the first embodiment. In FIG. 3, reflective type slit patterns (reflective pattern arrays) are illustrated as an example. The scale unit 202 includes two track patterns, that is, the first track pattern 203*a* and the second track pattern 203*b*. The scale unit 202 is configured as follows. When the light emitted from the light source 201 enters reflective portions (black portions) of the track patterns 203*a* and 203*b*, the light is reflected to the respective light receivers 204*a* and 204*b*. The reflective portions of the first track pattern 203*a* are formed at equal pitches P1 in a moving direction of the movable member with respect to the fixed member. The reflective portions of the second track pattern 203*b* are formed at equal pitches P2 in the moving direction. In this embodiment, the pitch P1 is determined so that forty reflective portions are formed over a total length Lmax of the scale (maximum displacement), that is, to have forty cycles over the total length Lmax (within the maximum displacement). The pitch P2 is determined so that thirty-nine reflective portions are formed over the total length Lmax of the track pattern, that is, to have thirty-nine cycles over the total length Lmax.

Figure 4:
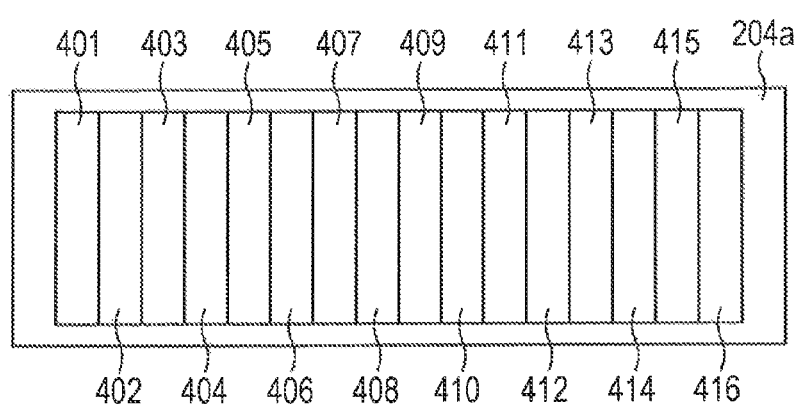
FIG. 4 is a plan view of a light receiver.

FIG. 4 is a plan view of the light receiver 204*a*. The light receiver 204*b* has the same configuration as that of the light receiver 204*a*. Sixteen photodiodes 401 to 416 are arranged on the light receiver 204*a* at equal intervals in a horizontal direction. The photodiodes 401, 405, 409, and 413 are electrically connected to each other. A group formed by the photodiodes 401, 405, 409, and 413 is referred to as "phase a". A group formed by the photodiodes 402, 406, 410, and 414 is referred to as "phase b". Similarly, a group formed by the photodiodes 403, 407, 411, and 415 is referred to as "phase c", and a group formed by the photodiodes 404, 408, 412, and 416 is referred to as "phase d". This embodiment is described based on the presupposition that a length for four photodiodes included in the light receiver 204*a* in a direction of arrangement of the photodiodes (for example, a distance from an end of the photodiode 401 to an end of the photodiode 404) is twice as large as the pitch P1 of the reflective portions of the first track pattern 203*a*. An optical path length of light which is emitted from the light source 201 and reflected by the reflective portions of the first track pattern 203*a* is half of an optical path length of light which is emitted from the light source 201 to the light receiver 204*a*. Therefore, a width of the reflected light received by the light receiver 204*a* is twice as large as the width at the reflective portion. Therefore, the width for the four photodiodes included in the light receiver 204*a* corresponds to one cycle of the pattern of the first track pattern 203*a*.

When the light from the light source 201, which is reflected by the first track pattern 203*a*, is received by the light receiver 204*a*, the phase-a, phase-b, phase-c, and phase-d photodiode groups respectively output photo-electric currents corresponding to the received light amounts. With the movement of the scale unit 202 in the X-axis direction, the phase-a, phase-b, phase-c, and phase-d photodiode groups output the currents (periodic signals) fluctuating in the following phase relationships. Specifically, with respect to the current in the phase a as a reference, the current fluctuates at 90° for the phase b, at 180° for the phase c, and at 270° for the phase d. The signal processing circuit 205 converts the output currents into voltages by a current-voltage converter. Next, the signal processing circuit 205 obtains a differential component between the phase a and the phase c and a differential component between the phase b and the phase d by a differential amplifier. Next, the signal processing circuit 205 generates, from the differential component between the phase a and the phase c and the differential component between the phase b and the phase d, a first A-phase displacement signal S1rA which is a A-phase displacement signal of the first track pattern 203*a* and a first B-phase displacement signal S1rB which is a B-phase displacement signal thereof whose phase is shifted by 90° from the phase of the first A-phase displacement signal S1rA. In a similar manner, for the light received by the light receiver 204*b*, a second A-phase displacement signal S2rA and a second B-phase displacement signal S2rB which are respectively an A-phase displacement signal and a B-phase displacement signal of the second track pattern 203*b* are also generated.

The signal processing circuit 205 outputs any one of a set of the first A-phase displacement signal S1rA and the first B-phase displacement signal S1rB and a set of the second A-phase displacement signal S2rA and the second B-phase displacement signal S2rB in accordance with the switch-over signal from the scale switcher 103.

As described above, the ABS sensor 104 outputs any one of the set of the first A-phase displacement signal S1rA and the first B-phase displacement signal S1rB and the set of the second A-phase displacement signal S2rA and the second B-phase displacement signal S2rB in accordance with the switch-over signal from the scale switcher 103.

Next, the method of deriving the absolute position is described.

The absolute position is derived by the ABS calculator 102. With reference to FIG. 5 and FIGS. 6A to 6D, a flow of deriving the absolute position is described.

In FIGS. 6A to 6D, the horizontal axis represents a position relative to the total length Lmax of the scale, and the vertical axis represents a signal level at that time.

In Step S501, processing starts and then proceeds to Step S502.

In Step S502, the first A-phase displacement signal S1rA and the first B-phase displacement signal S1rB are corrected.

The first A-phase displacement signal S1rA and the first B-phase displacement signal S1rB, or the second A-phase displacement signal S2rA and the second B-phase displacement signal S2rB, have different signal offsets or signal amplitudes in some cases. If the signals having different signal offsets or signal amplitudes are directly used for the absolute position calculation, an error may be generated in the derived absolute position Pabs. Therefore, the signals are required to be corrected.

In this embodiment, as described above, the length for the four photodiodes included in the light receiver 204a in the direction of arrangement of the photodiodes (for example, the distance from the end of the photodiode 401 to the end of the photodiode 404) is twice as large as the pitch P1 of the reflective portions of the first track pattern 203a. Therefore, the first A-phase displacement signal S1rA and the first B-phase displacement signal S1rB are respectively expressed as Expressions (1) and (2) below.

$$S1rA: a1 \times \cos\theta + s1 \quad (1)$$

$$S1rB: a2 \times \sin\theta + s2 \quad (2)$$

In Expressions (1) and (2), symbol a1 is an amplitude of the first A-phase displacement signal S1rA and symbol s1 is an offset of the first A-phase displacement signal, symbol a2 is an amplitude of the first B-phase displacement signal S1rB and symbol s2 is an offset of the first B-phase displacement signal, and symbol $\theta$ is a phase of the signal. The first A-phase displacement signal S1rA has a maximum value of s1+a1, a minimum value of s1−a1, the signal amplitude of a1, and an average value of s1. Similarly, the first B-phase displacement signal S1rB has a maximum value of s2+a2, a minimum value of s2−a2, the signal amplitude of a2, and an average value of s2. Through use of the values described above, the first A-phase displacement signal S1rA and the first B-phase displacement signal S1rB respectively expressed by Expressions (1) and (2) are corrected. Then, a corrected first A-phase displacement signal S1cA and a corrected first B-phase displacement signal S1cB are respectively expressed as Expressions (3) and (4) below.

$$S1cA: \{(a1 \times \cos\theta + s1) - s1\} \times a2 = a1 \times a2 \times \cos\theta \quad (3)$$

$$S1cB: \{(a2 \times \sin\theta + s2) - s2\} \times a1 = a1 \times a2 \times \sin\theta \quad (4)$$

As a result, the offsets of the first A-phase displacement signal S1rA and the first B-phase displacement signal S1rB are removed to obtain the first A-phase displacement signal S1cA and the first B-phase displacement signal S1cB having the same signal amplitude.

After the first A-phase displacement signal S1rA and the first B-phase displacement signal S1rB are corrected in Step S502 by the processing described above, the processing proceeds to Step S503.

In Step S503, through use of the corrected first A-phase displacement signal S1cA and the corrected first B-phase displacement signal S1cB, an arctangent calculation is performed to derive a signal Atan 1 as shown in FIG. 6A. The first track pattern 203a is a pattern which has forty cycles over the total length Lmax of the scale. Therefore, the signal Atan 1 has eighty cycles over the total length of the scale. Next, the first relative position signal Inc1 having forty cycles over the total length of the scale and a wave height Vmax is derived from the signal Atan 1. Specifically, a gain is applied to the signal Atan 1 so that the wave height of the signal Atan 1 becomes Vmax/2. The signal level is offset so that the signal level becomes 0 when the phase of the first B-phase displacement signal S1rB is at 0°. Then, by adding Vmax/2 when the phase is in the range of from 180° to 360°, the first relative position signal Inc1 is derived. Therefore, the first relative position signal Inc1 becomes a saw-tooth wave having forty cycles over the total length Lmax of the scale, as shown in FIG. 6B.

After the first relative position signal Inc1 is derived in Step S503, the processing proceeds to Step S504.

In Step S504, the second A-phase displacement signal S2rA and the second B-phase displacement signal S2rB are corrected.

The light receiver 204b has the same configuration as the light receiver 204a. Therefore, the length for four photodiodes included in the light receiver 204b in the direction of arrangement of the photodiodes (for example, the distance from the end of the photodiode 401 to the end of the photodiode 404) is twice as large as the pitch P1 of the reflective portions of the first track pattern 203a. The pitch P1 of the reflective portions of the first track pattern 203a and the pitch P2 of the reflective portions of the second track pattern 203b are different from each other. Therefore, the length for four photodiodes included in the light receiver 204b in the direction of arrangement of the photodiodes (for example, the distance from the end of the photodiode 401 to the end of the photodiode 404) is not twice as large as the pitch P2 of the reflective portions of the second track pattern 203b. Therefore, the second A-phase displacement signal S2rA and the second B-phase displacement signal S2rB have a relationship in which the phase shift therebetween is not 90°.

Thus, the second A-phase displacement signal S2rA and the second B-phase displacement signal S2rB are respectively expressed by Expressions (5) and (6) below.

$$S2rA: b1 \times \cos\theta + t1 \quad (5)$$

$$S2rB: b2 \times \sin(\theta + \alpha) + t2 \quad (6)$$

In Expressions (5) and (6), symbol b1 is an amplitude of the second A-phase displacement signal S2rA and symbol t1 is an offset of the second A-phase displacement signal S2rA, symbol b2 is an amplitude of the second B-phase displacement signal S2rB and symbol t2 is an offset of the second B-phase displacement signal S2rB, symbol $\theta$ is a phase of the signal, and symbol $\alpha$ is a shift amount of the phase. When the second A-phase displacement signal S2rA and the second B-phase displacement signal S2rB are corrected in the same manner as in the processing performed in Step S502, a corrected second A-phase displacement signal S2cA' and a corrected second B-phase displacement signal S2cB' are expressed by Expressions (7) and (8) below.

$$S2cA': \{(b1 \times \cos\theta + t1) - t1\} \times b2 = b1 \times b2 \times \cos\theta \quad (7)$$

$$S2cB': \{(b2 \times \sin(\theta + \alpha) + t2) - t2\} \times b1 = b1 \times b2 \times \sin(\theta + \alpha) \quad (8)$$

As a result, the offset t1 of the second A-phase displacement signal S2rA and the offset t2 of the second B-phase displacement signal S2rB are removed to obtain the second A-phase displacement signal S2cA' and the second B-phase displacement signal S2cB' having the same signal amplitude.

Next, processing for setting a phase difference between the second A-phase displacement signal S2cA' and the second B-phase displacement signal S2cB' to 90° by using Expressions (7) and (8) is described below.

A difference between Expressions (7) and (8) and the sum of Expressions (7) and (8) are respectively expressed by Expressions (9) and (10) below.

$$b1 \times b2 \times (\sin(\theta + \alpha) - \cos\theta) = \\ b1 \times b2 \times 2 \times \sin\{(\alpha - 90)/2\} \times \cos\{\theta + (\alpha + 90)/2\} \quad (9)$$

$$b1 \times b2 \times (\sin(\theta + \alpha) + \cos\theta) = \\ b1 \times b2 \times 2 \times \cos\{(\alpha - 90)/2\} \times \sin\{\theta + (\alpha + 90)/2\} \quad (10)$$

The phase difference given by Expressions (9) and (10) becomes 90° by the calculations described above.

The amplitudes in Expressions (9) and (10) are different from each other. Therefore, the amplitudes are next corrected to derive a second A-phase displacement signal S2cA and a second B-phase displacement signal S2cB having the same signal amplitude. Expression (9) is multiplied by cos $\{(\alpha-90)/2\}$ which is a part of the amplitude in Expression (10), and Expression (10) is multiplied by sin $\{(\alpha-90)/2\}$ which is a part of the amplitude in Expression (9). Then, Expressions (11) and (12) below are obtained.

Second A-phase displacement signal S2cA:

$$b1 \times b2 \times 2 \times \sin\{(\alpha-90)/2\} \times \cos\{(\alpha-90)/2\} \times \cos\{\theta + (\alpha+90)/2\} \quad (11)$$

second B-phase displacement signal S2cB:

$$b1 \times b2 \times 2 \times \sin\{(\alpha-90)/2\} \times \cos\{(\alpha-90)/2\} \times \sin\{\theta + (\alpha+90)/2\} \quad (12)$$

As a result, the offsets of the second A-phase displacement signal S2rA and the second B-phase displacement signal S2rB are removed so that the second A-phase displacement signal S2cA and the second B-phase displacement signal S2cB having the same signal amplitude are obtained.

After the second A-phase displacement signal S2rA and the second B-phase displacement signal S2rB are corrected in Step S504 by the processing described above, the processing proceeds to Step S505.

In Step S505, the same calculation as that performed in Step S503 is performed using the corrected second A-phase displacement signal S2cA and the corrected second B-phase displacement signal S2cB to derive a second relative position signal Inc2. The second track pattern 203b is a pattern having thirty-nine cycles over the total length Lmax of the scale. Therefore, the second relative position signal Inc2 becomes a saw-tooth wave having thirty-nine cycles over the total length Lmax of the scale, as shown in FIG. 6C.

After the second relative position signal Inc2 is derived in Step S505, the processing proceeds to Step S506.

In Step S506, a Vernier signal Pv1 as shown in FIG. 6D is derived by performing calculation in which a difference between the first relative position signal Inc1 and the second relative position signal Inc2 is calculated, and in a case where the difference is a negative value, Vmax is added. In this case, a difference in the number of cycles between the first relative position signal Inc1 and the second relative position signal Inc2 over the total length Lmax is 1. Therefore, the Vernier signal Pv1 becomes a saw-tooth wave having one cycle over the total length Lmax.

After the Vernier signal Pv1 is derived in Step S506, the processing proceeds to Step S507.

In Step S507, the absolute position Pabs is derived.

The signals S1rA, S1rB, S2rA, and S2rB each contain a noise component due to a disturbance and the like. Therefore, the first relative position signal Inc1 and the second relative position signal Inc2 derived from the signals S1rA, S1rB, S2rA, and S2rB also contain noise components. Further, the first relative position signal Inc1 and the second relative position signal Inc2 cause a phase shift amount in the signals due to a delay in obtaining the signals S1rA, S1rB, S2rA, and S2rB and the movement of the movable member 21 during a signal obtaining delay time. In order to correct the noise component and an error component E due to the phase shift amount, synchronous operation of the Vernier signal Pv1 and the first relative position signal Inc1 is performed. The synchronous operation is performed to derive a signal, as a signal Vabs indicating the absolute position, by synthesizing the Vernier signal Pv1 which is an upper-level signal and the first relative position signal Inc1 which is a lower-level signal. The absolute position Pabs is derived from the signal Vabs. A method of deriving the absolute position Pabs from the signal Vabs is described later.

FIGS. 7A to 7D show how the waveforms change by the synchronous operation described above.

In FIGS. 7A to 7D, the horizontal axis indicates the position on the total length Lmax of the scale, whereas the vertical axis indicates the signal level at the position on the total length Lmax. In addition, symbol Vmax indicates the maximum value of the signal level, and symbol N1 indicates a cycle number of a region from a start point of the scale. The number of cycles over the total length Lmax (maximum N1) is defined as N1max. In this embodiment, the first track pattern 203a has forty cycles over the total length Lmax of the scale. Therefore, N1max is 40, where N1 is a natural number ranging from 1 to 40.

Figure 7A:
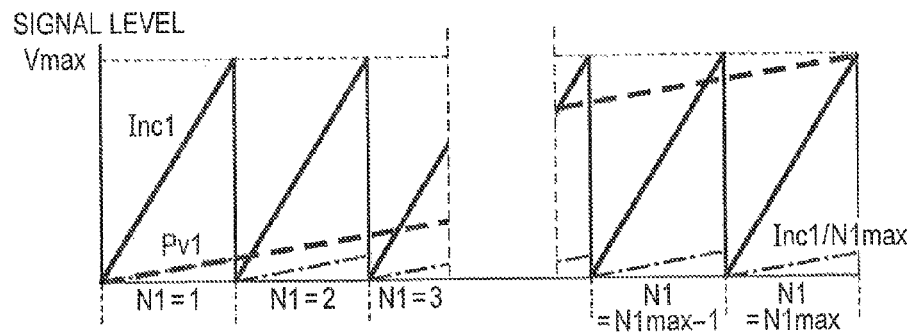
FIG. 7A is a graph showing a change in a waveform in synchronous operation.
Figure 7B:
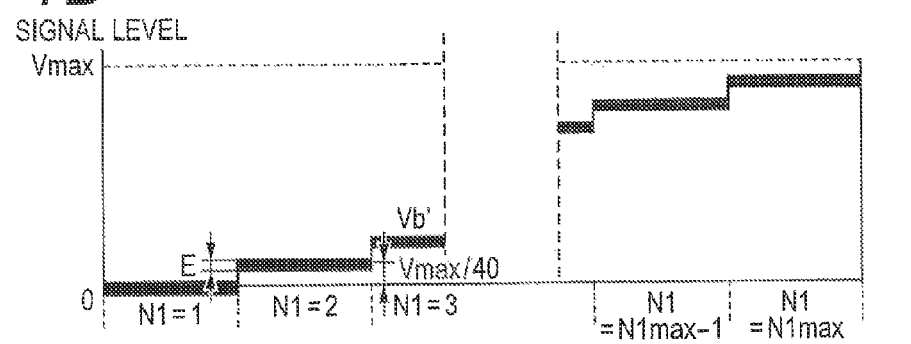
FIG. 7B is a graph showing a difference between Pv1 within FIG. 7A and (Inc1/N1max).

FIG. 7A shows waveforms of Inc1, Pv1, and Inc1/N1max. When a difference between Pv1 and Inc1/N1max having the same gradient as Pv1 is taken, a step-like waveform containing the error component E shown in FIG. 7B is generated. A signal Vb' having the waveform shown in FIG. 7B is expressed by Expression (13) below. A signal level for one step of the step-like waveform is Vmax/N1max.

$$Vb' = Pv1 - (Inc1/N1max) \quad (13)$$

Figure 7C:
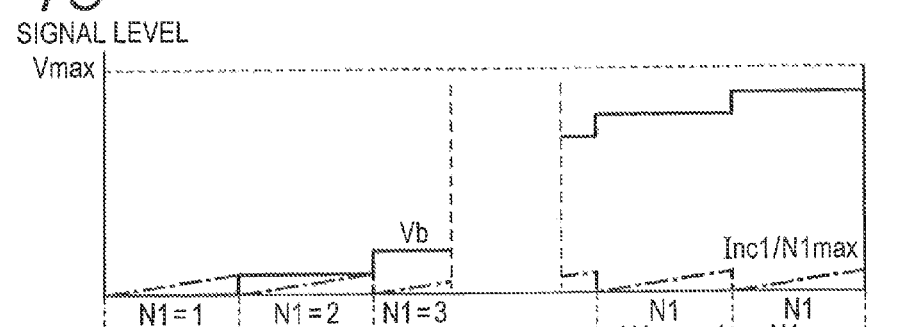
FIG. 7C is a graph obtained by removing an error component of the waveform within FIG. 7B.

Next, the error component E of the waveform shown in FIG. 7B is removed by rounding. Then, a waveform shown in FIG. 7C is obtained. A signal Vb having the waveform shown in FIG. 7C is expressed by Expression (14) below.

$$Vb = \text{Round}[\{Pv1 - (Inc1/N1max)\} \times (N1max/Vmax)] \times (Vmax/N1max) \quad (14)$$

where Round[ ] is a function for rounding off the first decimal place.

The error component E can be expressed by Expression (15).

$$E = \{Pv1 - (Inc1/N1max)\} - Vb \quad (15)$$

Figure 7D:
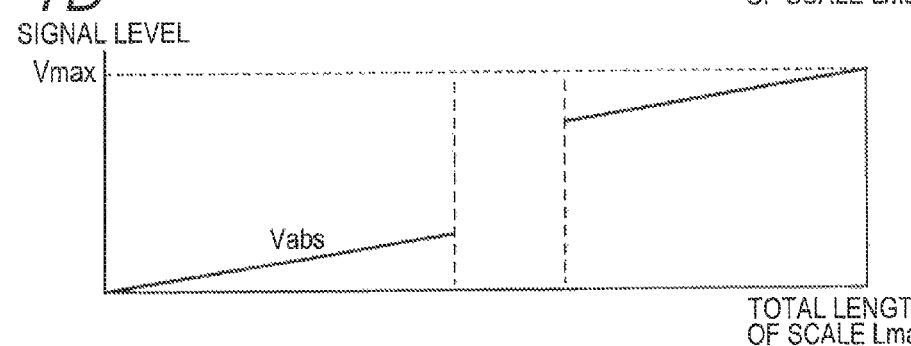
FIG. 7D is a graph obtained by adding (Inc1/N1max) to the waveform within FIG. 7C.

The waveform of Inc1/N1max is added to the waveform of the signal Vb shown in FIG. 7C to generate the signal level Vabs indicating the absolute position obtained by removing the error component E, as shown in FIG. 7D.

The synchronous operation is performed by a calculation expressed by Expression (16) below.

$$Vabs = Vb + (Inc1/N1\text{max}) \tag{16}$$

From the signal level Vabs indicating the absolute position, the absolute position Pabs is expressed by Expression (17).

$$Pabs = Vabs \times (L\text{max}/V\text{max}) \tag{17}$$

After the absolute position Pabs is derived in Step S507, the processing proceeds to Step S508 where the processing ends.

By the processing described above, the absolute position Pabs can be derived.

Next, the absolute position deriving information and the determination of the reliability of the absolute position are described.

Figure 8:
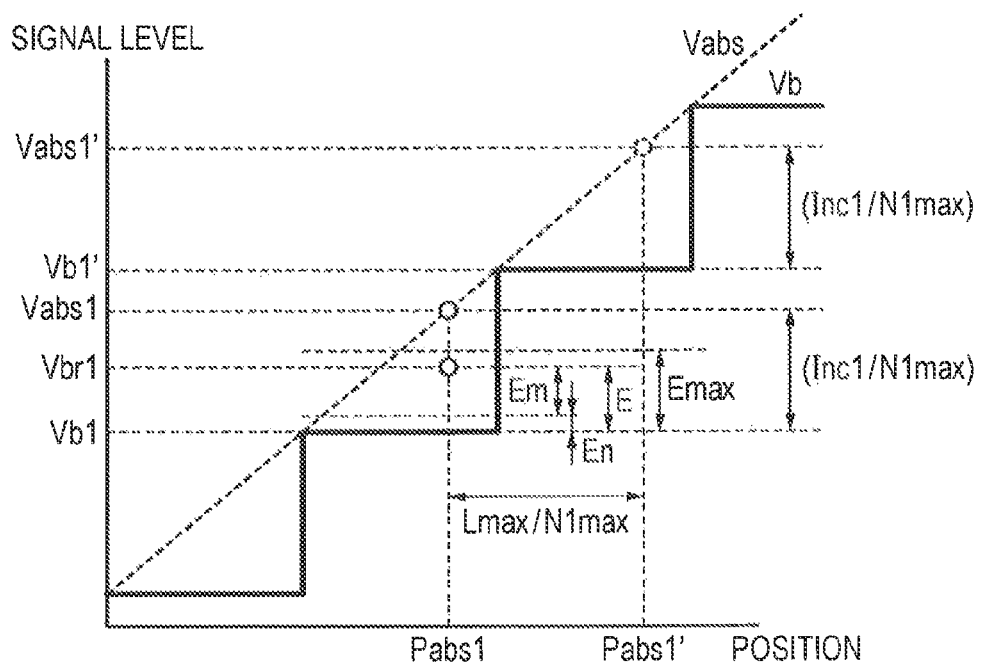
FIG. 8 is an explanatory graph of an error component in synchronous operation.

FIG. 8 is a graph obtained by enlarging the waveform of FIG. 7C. Here, Emax is a maximum value of the error component E that can be removed by Expression (14). Based on Expression (14), the error component E is removed by rounding, and hence Emax is half of Vmax/N1max, and is expressed by Expression (18).

$$E\text{max} = V\text{max}/(N1\text{max} \times 2) \tag{18}$$

Vbr1 is a signal level derived by using Expression (13) in the absolute position Pabs1. Further, Vb1 and Vb1' are signal levels derived by using Expression (14) in the absolute position Pabs1. Here, based on Expression (14), the signal level obtained when the error component E is correctly removed is Vb1, and the signal level obtained when the error component E exceeds Emax and cannot be correctly removed is Vb1'.

When Vb1 is derived by Expression (14), the absolute position is derived as the position of Pabs1 by Expression (16). On the other hand, when Vb1' is derived by Expression (14), the absolute position is derived by Expression (16) as the position of Pabs1' displaced from the position of Pabs1 by Lmax/N1max.

By the processing described above, the erroneous deriving of the absolute position occurs. The error component E that does not cause the erroneous deriving of the absolute position is expressed by Expression (19) based on Expression (18).

$$E < E\text{max} = V\text{max}/(N1\text{max} \times 2) \tag{19}$$

The error component E may include an error component En due to the noise component included in the signals S1rA, S1rB, S2rA, and S2rB and an error component Em that occurs due to the movement of the movable member 21 during a signal obtaining delay time Ts. A relationship among the error component E, the error component En due to the noise component such as a disturbance, and the error component Em that occurs due to the movement of the movable member 21 during the signal obtaining delay time Ts is expressed by Expression (20).

$$E = En + Em \tag{20}$$

Here, the Vernier signal Pv1 is a difference between the first relative position signal Inc1 and the second relative position signal Inc2, and hence the relationship among a noise component En1 of the first relative position signal Inc1, a noise component En2 of the second relative position signal Inc2, and the error component En due to the noise component can be expressed by Expression (21) based on Expression (13).

$$En = En1 \times N2\text{max}/N1\text{max} + En2 \tag{21}$$

En1 and En2 are derived by being measured in advance, and retained in the ABS reliability reference data retainer 107 as fixed values. Accordingly, the error component Em to be a variable factor can be expressed by Expression (22) below.

Here, in regard to the error component Em, with the first relative position signal Inc1 as a reference, a variation of the signal level due to a shift in the second relative position signal Inc2 is conceivable as the error component Em.

Therefore, when a movement amount by which the movable member 21 has moved during the time that has elapsed until the signals S1rA, S1rB, S2rA, and S2rB are obtained is defined as ΔPv, the error component Em is expressed by Expression (22).

$$Em = (N2\text{max} \times V\text{max} \times \Delta Pv)/L\text{max} \tag{22}$$

In Expressions (21) and (22), N2max represents a maximum cycle of the second track pattern 203b with respect to the total length Lmax of the scale, and is 39 in this embodiment.

Here, when E, Em, and En are erased from Expression (19), Expression (20), Expression (21), and Expression (22), the following expression is obtained.

$$\Delta P_v < \frac{L_{max}}{N1_{max} \times N2_{max} \times 2} - \frac{L_{max}}{V_{max} \times N2_{max}}\left(En1 \times \frac{N2_{max}}{N1_{max}} + En2\right)$$

Here, assuming that a threshold value ΔPvmax of ΔPv indicating a limit of the occurrence of the erroneous deriving of the absolute position is expressed by:

$$\Delta P_{vmax} = \frac{L_{max}}{N1_{max} \times N2_{max} \times 2} - \frac{L_{max}}{V_{max} \times N2_{max}}\left(En1 \times \frac{N2_{max}}{N1_{max}} + En2\right) \tag{23}$$

a relationship between the threshold value ΔPvmax and ΔPv is expressed by Expression (24).

$$\Delta Pv < \Delta Pv\text{max} \tag{24}$$

By the processing described above, all the values on the right side of Expression (23) are fixed, and hence the threshold value ΔPvmax indicating that the erroneous deriving of the absolute position does not occur can be determined uniquely for the movement amount (relative displacement amount) ΔPv by which the movable member 21 has moved with respect to the fixed member 22 during the time (within a predetermined cycle) that has elapsed until the signals S1rA, S1rB, S2rA, and S2rB are obtained.

Accordingly, as the absolute position deriving information for determining the reliability of the absolute position Pabs, the delay in obtaining the signals S1rA, S1rB, S2rA, and S2rB and the movement amount ΔPv of the movable member 21 during the signal obtaining delay time are used. Further, when the movement amount ΔPv satisfies Expression (24), the ABS determining unit 101 determines the absolute position by determining the reliability of the obtained absolute position Pabs to be high. A method of deriving the movement amount ΔPv is described later.

Here, Expression (23) indicates the threshold value ΔPvmax with respect to ΔPv obtained when Expression (14) for removing the error component E is conducted once. The processing of Expression (14) is performed a plurality of times by using a plurality of Vernier signals, and ΔPvmax needs to be obtained for each time of the calculation of Expression (14) to derive the absolute position Pabs. The reliability of the absolute position Pabs can be determined to be high when the movement amount ΔPv does not exceed the minimum ΔPvmax among the respective threshold values ΔPvmax.

Further, in regard to the error component En due to the noise component derived in Expression (21), in this embodiment, the Vernier signal Pv1 is derived from the difference between the first relative position signal Inc1 and the second relative position signal Inc2. However, when the cycles of the first relative position signal Inc1 and the second relative position signal Inc2 are multiplied and the Vernier signal Pv1 is derived from the difference between the signals obtained by the multiplying, it is necessary to derive the error component En in consideration of a multiplication. Specifically, it is necessary to derive the error component En due to the noise component from a value obtained by multiplying each of En1 and En2 by a multiplying factor corresponding to the multiplication.

Next, the method of deriving the movement amount ΔPv is described.

Figure 9:
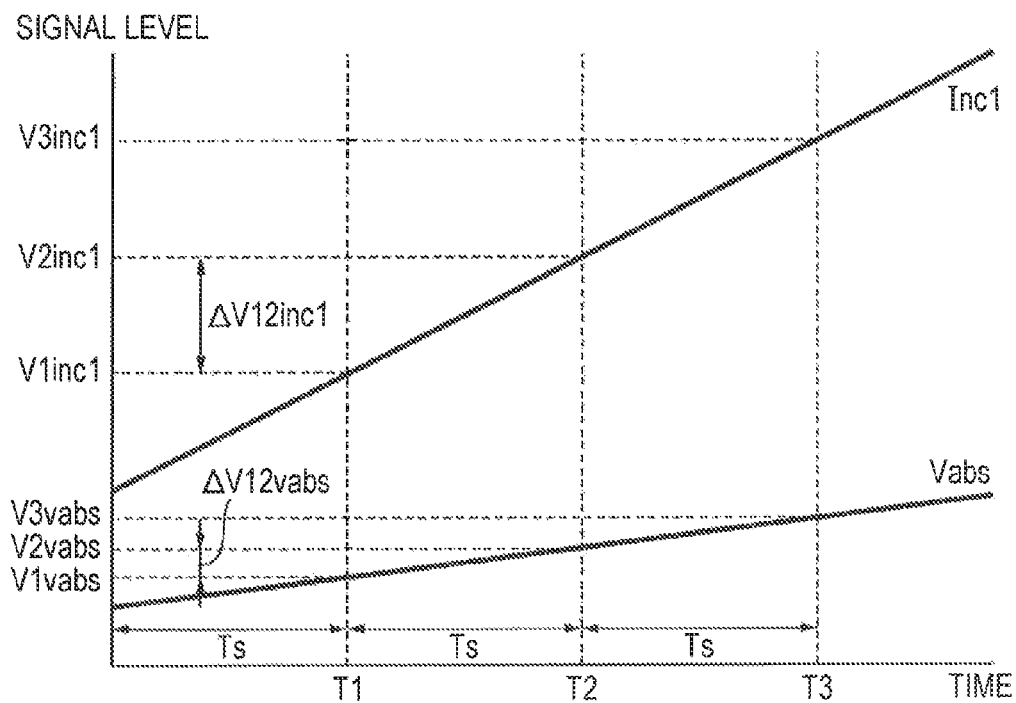
FIG. 9 is a graph showing a relationship between the first relative position signal and the Vernier signal at a signal obtaining time.

FIG. 9 shows a relationship between the signal levels of Inc1 and Vabs obtained when the movable member 21 is moving. In FIG. 9, the horizontal axis represents a time, and the vertical axis represents a signal level. T1 and T3 are times at which the signals S1rA and S1rB are obtained, and T2 is a time at which the signals S2rA and S2rB are obtained. Here, time intervals between T1 and T2 and between T2 and T3 are the signal obtaining delay time Ts, and are the same time interval. As the signal obtaining delay time Ts, a time necessary for each signal to be sufficiently stabilized after the signals S1rA and S1rB and the signals S2rA and S2rB are switched is set. V1vabs, V2vabs, and V3vabs are signal levels of Vabs at the times T1, T2, and T3, respectively. Further, V1inc1, V2inc1, and V3inc1 are signal levels of Inc1 at the times T1, T2, and T3, respectively. ΔV12inc1 is a variation of the signal level of Inc1 between T1 and T2, and ΔV12vabs is a variation of the signal level of Vabs between T1 and T2.

Here, it is possible to derive the absolute position Pabs by obtaining the signals S1rA, S1rB, S2rA, and S2rB at T1 and T2. However, in order to derive the movement amount ΔPv of the movable member 21 while the signals S1rA, S1rB, S2rA, and S2rB are obtained, the signals S1rA and S1rB are obtained again at the timing of T3.

Assuming that the movable member 21 is moving at constant speed, T1, T2, and T3 are spaced at even intervals, and hence ΔV12inc1 can be expressed by Expression (25).

$$\Delta V12inc1 = (V3inc1 - V1inc1)/2 \quad (25)$$

Here, V1inc1 and V3inc1 can be derived by the processing of Step S502 and Step S503 of FIG. 5 from the signals S1rA and S1rB obtained at the timings of T1 and T3, respectively.

Further, Vabs is one cycle with respect to the total length Lmax of the scale with Inc1 corresponding to an N1max cycle, and hence ΔV12vabs can be expressed by Expression (26).

$$\Delta V12vabs = \Delta V12inc1/N1max \quad (26)$$

The movement amount ΔPv can be derived from ΔV12vabs based on Expression (27).

$$\Delta Pv = \Delta V12vabs \times (Lmax/Vmax) \quad (27)$$

Figure 10:
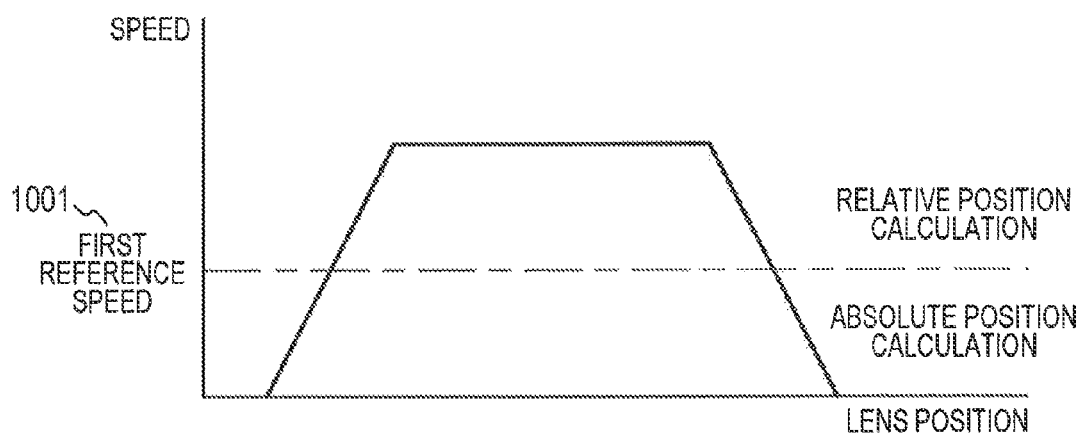
FIG. 10 is a graph showing distinction between calculation of the absolute position and calculation of the relative position based on a lens driving pattern.

With reference to FIG. 10, a case where the movable member 21 is a lens is described. A typical drive pattern of the lens is expressed by a trapezoid. In FIG. 10, the horizontal axis represents a position of the lens, and the vertical axis represents a moving speed of the lens. The lens accelerates after starting from a stopped state, to move at designated speed, and decelerates after starting to approach a stopping target position, to stop at the target position.

When a zoom lens is moving at high speed, an angle of view for photographing is to be changed suddenly. Further, when a focus lens is moving at high speed, a focus position is to be changed suddenly. In other words, when the lens is moving at high speed, it is conceivable to be rarely necessary to obtain a high precision picture. On the other hand, near the angle of view to be intended or near an object distance to be targeted, in order to photograph to obtain the picture to be needed with high precision, an operator slowly drives the zoom lens or the focus lens to adjust the lens to a desired state (lens position). Here, when the lens is moving at high speed by zooming or focusing, the precision in position is not necessary for the above-mentioned reason.

In a case of relative position calculation, when there is a mistake in deriving the position, an error may affect the lens position, and once the error affects the lens position, the lens position keeps being controlled in accordance with erroneous positional information. However, a detailed picture is not necessary when the lens is moving at high speed for the above-mentioned reason (there is no need to identify the lens position with high precision), and hence sufficient position control can be carried out by deriving the position by the relative position calculation.

In the position detecting apparatus according to the embodiment of the present invention, a signal (corresponding detection pattern array) output from the ABS sensor 104 is switched at predetermined cycles. By selecting one pattern array and counting a pulse of the signal based on the selected pattern array, it is possible to calculate a displacement amount (relative position) from a predetermined reference position because the cycle (dimension: length) of each pattern array is known. As long as a predetermined reference position is identified in advance as the absolute position by the absolute position calculator, the position of the movable member with respect to the fixed member can be obtained by offsetting (adding) the calculated displacement amount (relative position) to the absolute position. In the embodiment of the present invention, the ABS calculator 102 is also used as a relative position calculator configured to execute calculation (relative position calculation) of the position of the movable member with respect to the fixed member and the relative position in addition to the absolute position calculation.

Further, the absolute position calculation is carried out when the lens is being started and stopped, and hence even once a measuring error is included in the relative position calculation, the absolute position calculation is executed when the lens is driven at low speed or stopped, which allows correct positional information to be obtained. Therefore, detailed picture expressions that satisfy required image quality are enabled also by carrying out the relative position calculation when the lens is driven at high speed and carrying out the absolute position calculation when the lens is driven at low speed or stopped.

Next, a switching timing between the absolute position calculation and the relative position calculation is described. As described above, a large amount of calculation is necessary to derive the absolute position, which requires a long period of time. Therefore, as understood from the relationship between Expression (23) and Expression (24), erroneous calculation may be caused when the lens is moving at high speed. That is, to execute the absolute position calculation, the Vernier calculation is executed based on a plurality of signals obtained sequentially, and hence a plurality of signals necessary to execute the Vernier calculation cannot be obtained simultaneously. Accordingly, while the lens is moving, the absolute position is calculated based on the plurality of signals obtained in different positions, and hence the erroneous calculation can be caused when the lens is moving at high speed.

Therefore, the lens position is derived by the relative position calculation that involves a short calculation time when the lens is moving at high speed equal to or higher than a first reference speed 1001 shown in FIG. 10. Further, when the lens is moving at a speed lower than the first reference speed 1001, the movement amount of the lens per unit time is small, and hence the lens position is derived by the absolute position calculation that requires a long calculation time.

In the position detecting apparatus according to the embodiment of the present invention, the ABS calculator 102 configured to detect the displacement amount of the moving member with respect to the fixed member also plays the role as a speed detector, and calculates the moving speed of the movable member with respect to the fixed member from the displacement amount within the unit time.

By thus switching the calculation method depending on the moving speed of the lens, there is no need to increase a clock frequency used by the CPU configured to carry out the position calculation, and it is possible to lower current consumption, which allows the lens to be controlled with sufficient precision without use of an expensive calculation unit.

Figure 11:
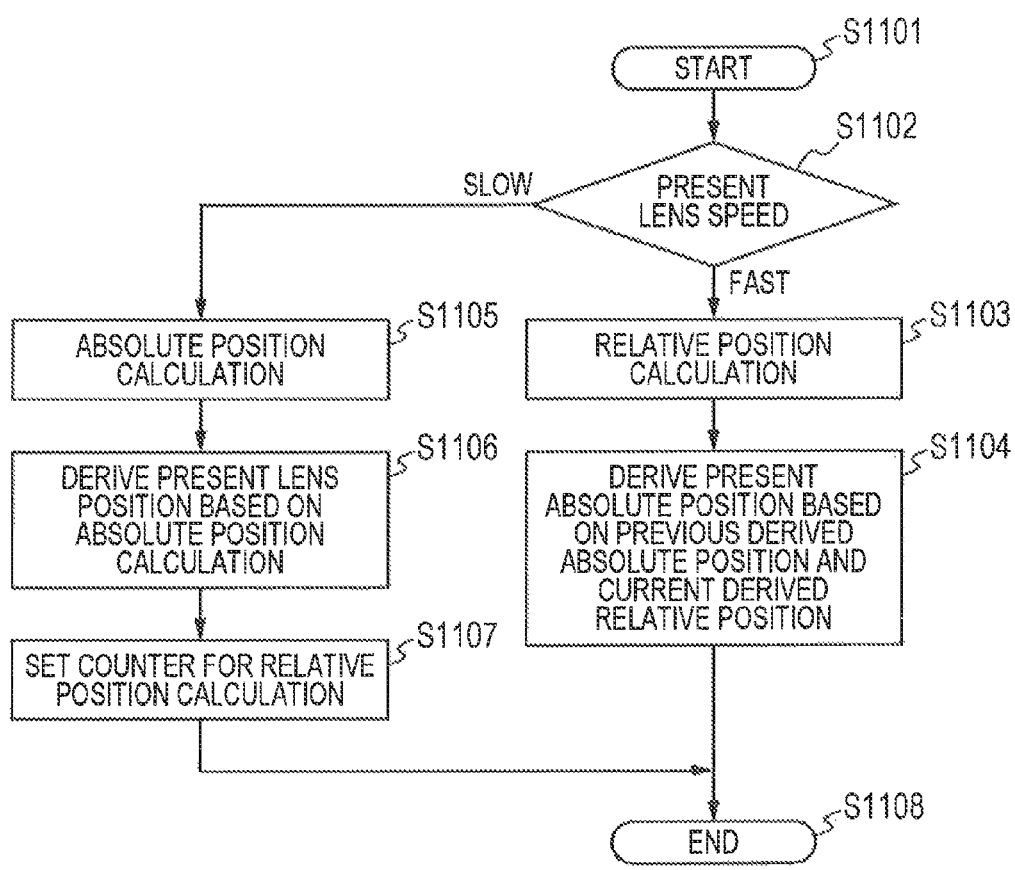
FIG. 11 is a flowchart illustrating calculation of an absolute value and a relative value based on a speed of a lens.

With reference to FIG. 11, the flow is described.

In Step S1101, processing starts and then proceeds to Step S1102. In Step S1102, the first reference speed 1001 and the present lens speed are compared. When the lens is moving at the speed lower than the first reference speed 1001, it is determined that the lens is moving at low speed, and the processing proceeds to Step S1105. In Step S1105, the absolute position calculation is carried out for the lens, and the processing proceeds to Step S1106. In Step S1106, the reliability of a calculation result obtained in Step S1105 is determined, while the present position (absolute position) of the lens is derived, and the processing proceeds to Step S1107. In Step S1107, a correspondence between the counter value for the calculation of the relative position and the calculated absolute position is saved. After that, the processing proceeds to Step S1108, and this flow is brought to an end.

Further, when the lens is moving at the speed equal to or higher than the first reference speed 1001 in Step S1102, it is determined that the lens is moving at high speed, and the processing proceeds to Step S1103. In Step S1103, the relative position of the lens is calculated, and the processing proceeds to Step S1104. In Step S1104, the present position of the lens is calculated based on the absolute position calculated previously (in advance) and the relative position calculated currently. In Step S1104, the lens position (absolute position) is derived based on the correspondence between the counter value for the calculation of the relative position and the absolute position saved in Step S1107 and the current relative position calculation result. After Step S1104, the processing proceeds to Step S1108, and this flow is brought to an end.

This flow is periodically called for the lens control, and hence when the lens speed is determined to be high speed again next time, the absolute position derived based on the relative position calculation is used to derive the absolute position along with the relative position obtained by the relative position calculation as the absolute position to be a reference.

When the lens is thus moving at high speed, the absolute position can be derived by using the relative position that involves fast calculation processing to derive the present position of the lens, and hence there is no need to increase the clock frequency in order to increase throughput of the CPU, which suppresses the current consumption. Further, an expensive CPU is also not necessary, which leads to reduction in cost.

Second Embodiment

Now, a position detecting apparatus according to a second embodiment of the present invention is described.

Figure 12:
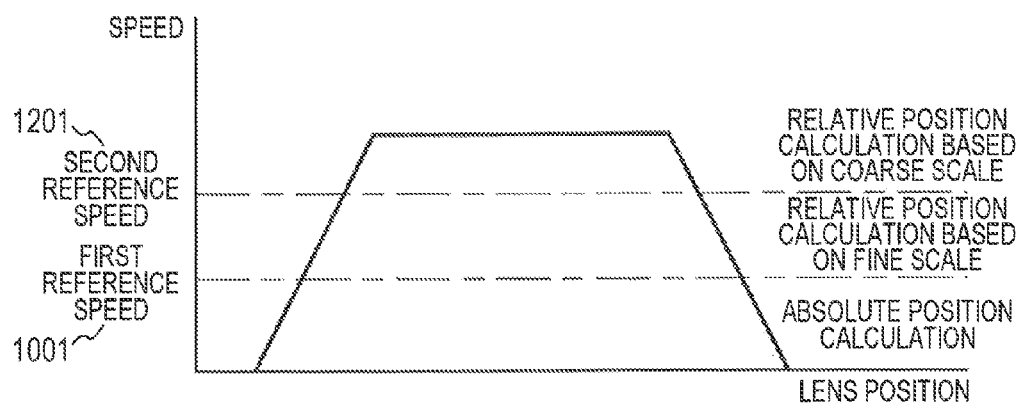
FIG. 12 is a graph showing switching of scales used for relative position calculation based on the speed.

To obtain the absolute position in the above-mentioned manner, a coarse scale and a fine scale are necessary. The relative position calculation using the coarse scale and the fine scale is described with reference to FIG. 12.

The first reference speed 1001 and a second reference speed 1201 faster than the first reference speed 1001 are set. In the case where the lens speed is lower than the first reference speed, the absolute position calculation is carried out as described above, and the present position of the lens is derived. In the case where the lens speed is equal to or higher than the first reference speed 1001, the relative position is derived. In this case, when the moving speed of the lens is equal to or higher than the first reference speed and lower than the second reference speed 1201, the relative position calculation based on the fine scale is carried out to derive the present position of the lens. Further, when the moving speed of the lens is equal to or higher than the second reference speed 1201, the relative position calculation based on the coarse scale is carried out to derive the present position of the lens. At this time, in the relative position calculation based on the course scale, the lens positional information becomes coarse. However, as described above, when the lens is moving at high speed, there is no problem in controllability with respect to the picture to be used, and even when the position of the lens to be detected is detected by a more course mesh as the moving speed of the lens becomes faster, there is no problem in terms of the controllability for the driving of the lens and the image quality demanded for the photographic image to be obtained by the photographing. Therefore, the scale for detecting the position of the lens can be used suitably between the fine scale and the course scale for the high-speed case in consideration of the controllability.

The second reference speed 1201 is defined by a Nyquist frequency of a control sampling cycle Tss (dimension: (time)) used for the lens control. This is because, when the frequency (dimension: $(time)^{-1}$) of the variation of the fine scale in the lens position which is determined based on the moving speed of the lens and the cycle (dimension: (length)) of the fine scale becomes equal to or higher than a Nyquist frequency $1/(2Tss)$ of the control sampling cycle Tss (dimension: (time)), reproducibility of the fine scale is lost, and the positional information obtained by the relative position calculation is ruined. In other words, such a lens speed that the lens moves at high speed and that the frequency of the variation of the fine scale in the lens position becomes equal to or higher than the Nyquist frequency 1/(2Tss) of a control sampling frequency 1/Tss only needs to be set as the second reference speed.

Figure 13:
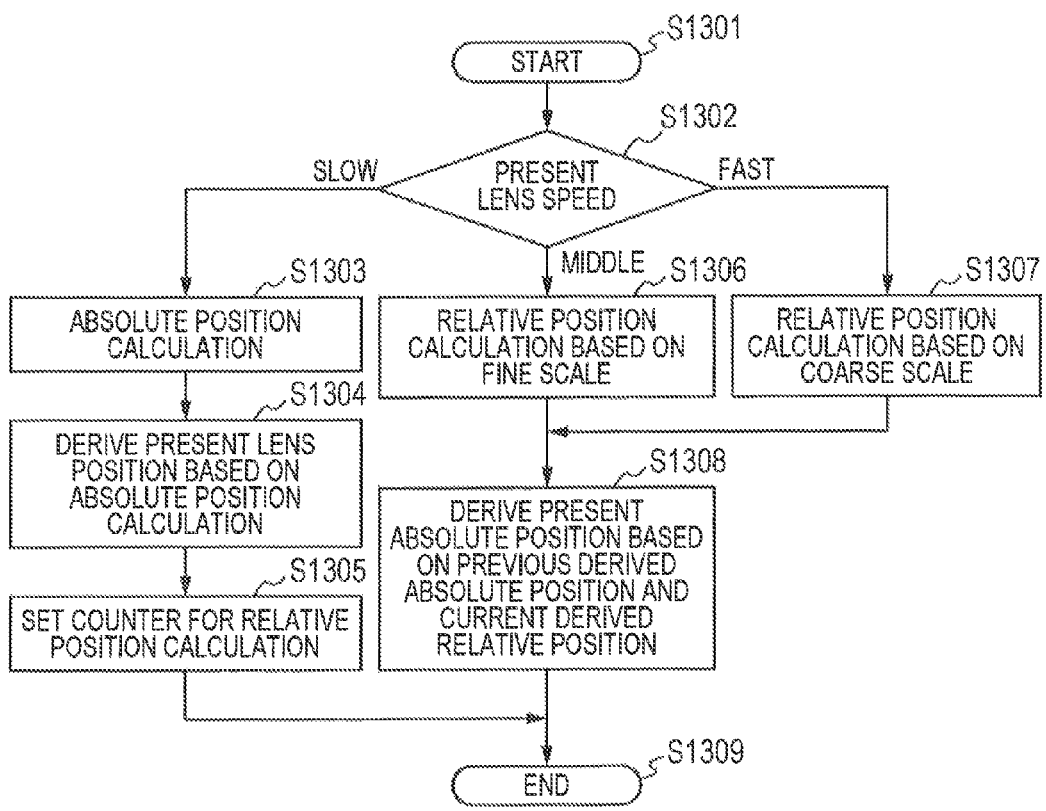
FIG. 13 is a flowchart illustrating the switching of the scales used for the relative position calculation based on the speed.

With reference to FIG. 13, a flow of the absolute position calculation and the relative position calculation using the first reference speed 1001 and the second reference speed 1201 is described.

In Step S1301, processing starts and then the processing proceeds to Step S1302. In Step S1302, the present speed of the lens and the reference speed are compared. In the case where the lens speed is lower than the reference speed 1001, it is determined that the lens is moving at low speed, and the processing proceeds to Step S1303. In the case where the lens speed is equal to or higher than the first reference speed 1001 and lower than the second reference speed 1201 in Step S1302, it is determined that the lens is moving at middle speed, and the processing proceeds to Step S1306. In the case where the lens speed is equal to or higher than the second reference speed in Step S1302, it is determined that the lens is moving at high speed, and the processing proceeds to Step S1307. In Step S1303, the absolute position calculation is carried out, and the processing proceeds to Step S1304. In Step S1304, the reliability of the calculation result obtained in Step S1303 is determined, while the present position (absolute position) of the lens is derived, and the processing proceeds to Step S1305. In Step S1305, the correspondence between the counter value for the calculation of the relative position and the calculated absolute position is saved. After that, the processing proceeds to Step S1309, and this flow is brought to an end.

Further, in Step S1306, the relative position is calculated by using the fine scale of the scales for deriving the absolute position, and the processing proceeds to Step S1308. In Step S1307, the relative position is calculated by using the coarse scale of the scale for deriving the absolute position, and the processing proceeds to Step S1308. In Step S1308, the present position of the lens is calculated based on the absolute position calculated previously (in advance) and the relative position calculated currently. In Step S1308, the lens position (absolute position) is derived based on the correspondence between the counter value for the calculation of the relative position and the absolute position saved in Step S1305 and the current relative position calculation result. After Step S1308, the processing proceeds to Step S1309, and this flow is brought to an end.

Third Embodiment

A case where a Vernier type absolute encoder is used to derive the absolute position by using two scales from among three scales, namely, the coarse scale, the medium scale, and the fine scale, is described. It is possible to derive a first absolute position obtained by first absolute position calculation based on the signals received from the fine scale and the medium scale and a second absolute position obtained by second absolute position calculation based on the signals received from the medium scale and the coarse scale.

Figure 14:
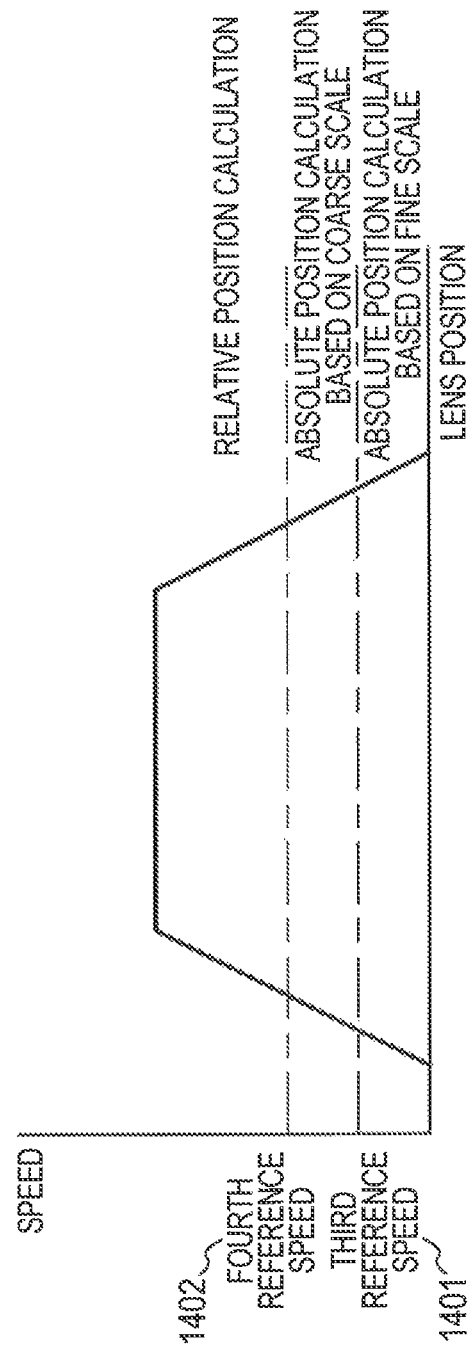
FIG. 14 is a graph showing deriving of the absolute position while switching the scale for the absolute position based on the speed.

With reference to FIG. 14, a relationship among the first absolute position calculation, the second absolute position calculation, and the relative position calculation based on the lens speed is described. When the lens speed is lower than a third reference speed 1401, the first absolute position serving as an absolute position having high resolving power based on the first absolute position calculation is calculated. Further, when the lens speed is equal to or higher than the third reference speed 1401 and lower than a fourth reference speed 1402 faster than the third reference speed 1401, the second absolute position based on the second absolute position calculation is calculated. Here, the second absolute position has a lower resolving power than the first absolute position, and hence the absolute position based on the calculation having coarse resolving power is derived. However, as described above, when the lens speed is not low, no influence is exerted on the control even with low resolving power. Further, when the lens speed is equal to or higher than the fourth reference speed 1402, the position of the lens is identified by the relative position calculation that involves a short calculation time. When the relative position calculation is carried out, the current lens position (absolute position) is derived in combination with the absolute position derived previously (in advance) in the same manner as described above.

Further, three kinds of scales are provided, and hence it may be assumed that the scale used for carrying out the relative position calculation is divided into speed ranges that respectively use the three kinds of scales as follows. Alternatively, the scale may be divided into speed ranges so as to use two kinds of scales.

For example, assuming that the scale is divided into the speed ranges for three kinds of scales to be used for executing the relative position calculation, a fifth reference speed (not shown) faster than the fourth reference speed 1402, a sixth reference speed (not shown) faster than the fifth reference speed, and a seventh reference speed (not shown) faster than the sixth reference speed are provided as reference speeds.

When the lens speed is equal to or higher than the fourth reference speed 1402 and lower than the fifth reference speed, the relative position calculation based on the fine scale is carried out. Further, when the lens speed is equal to or higher than the fifth reference speed and lower than the sixth reference speed, the relative position calculation based on the medium scale is carried out. In addition, when the lens speed is equal to or higher than the sixth reference speed, the relative position calculation based on the coarse scale is carried out.

In this manner, a plurality of absolute positions and a plurality of relative positions can be derived by using at least three scales, and hence it is possible to obtain the absolute position corresponding to the speed of the lens with high resolving power, which improves the controllability of the lens.

As described above, when a shift is made from the relative position calculation to the absolute position calculation due to lowering of the moving speed of the lens, a new absolute position is calculated without using the lens position calculated by the relative position calculation. This is because, even when errors are accumulated by the relative position calculation, it is possible to cancel an influence exerted by the accumulated errors by newly deriving the absolute position. Accordingly, it is possible to control the driving of the lens with high precision by using the positional information that is not affected by the accumulated errors that can occur in the relative position calculation at all times when the speed is low.

Here, by providing the above-mentioned reference speeds with hysteresis, that is, by causing the reference speeds to be employed differently during acceleration and during deceleration, it is possible to prevent the controllability from deteriorating when the speed of the lens is near the reference speed.

The position detecting apparatus according to the embodiments of the present invention has been described so far by taking the position detection of the lens as an example, but can also be applied to the position detection of a movable optical member such as a zoom lens, a focus lens, or an iris as a position detection subject. In addition, the position detecting apparatus can also be applied to the position detection of the movable member of an operation member or the like such as a zoom demand (zoom operation unit), a focus demand (focus operation unit), or a flange back adjustment (flange back adjusting unit), which is used as a lens accessory serving as an optical operating apparatus configured to drive the movable optical member of a lens apparatus. Further, without separately providing a circuit for speed detection in order to subject the lens to speed detection, it is possible to derive the speed by inputting a signal to, for example, a comparator, to create a square wave and input the square wave to a counter of the CPU by using the coarse scale or the fine scale of the absolute encoder.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-057336, filed Mar. 20, 2014, which is hereby incorporated by reference herein in its entirety.

What is claimed is:

1. A position detecting apparatus which detects a position of a movable member with respect to a fixed member, comprising:
a scale having a plurality of pattern arrays formed of cycles that differ from one another in a moving direction of the movable member;
a sensor configured to detect a plurality of phase signals based on the scale depending on the position of the movable member with respect to the fixed member;
a signal processor configured to generate a plurality of displacement signals based on the plurality of phase signals detected by the sensor and sequentially output the generated plurality of displacement signals by switching the plurality of displacement signals at a predetermined cycle;
a speed detector configured to detect a moving speed of the movable member based on at least one of the plurality of displacement signals;
an absolute position calculator configured to derive the position of the movable member based on at least two displacement signals among the plurality of displacement signals; and
a relative position calculator configured to derive a displacement amount with respect to a predetermined position based on a selected displacement signal among the plurality of displacement signals, wherein:
the position calculated by the absolute position calculator is set as the position of the movable member when the moving speed of the movable member is lower than a first reference speed; and
the position of the movable member is calculated based on the position of the movable member obtained by the absolute position calculator in advance and the displacement amount with respect to the position calculated by the relative position calculator when the moving speed of the movable member is equal to or higher than the first reference speed.

2. The position detecting apparatus according to claim 1, wherein:
the position calculated by the absolute position calculator is set as the position of the movable member when the moving speed of the movable member is lower than the first reference speed;
the position of the movable member is calculated based on the position of the movable member obtained by the absolute position calculator in advance and the displacement amount with respect to the position calculated by the relative position calculator based on a first displacement signal among the plurality of displacement signals when the moving speed of the movable member is equal to or higher than the first reference speed and lower than a second reference speed higher than the first reference speed; and
the position of the movable member is calculated based on the position of the movable member obtained by the absolute position calculator in advance and the displacement amount with respect to the position calculated by the relative position calculator based on a second displacement signal having a longer cycle than the first displacement signal among the plurality of displacement signals when the moving speed of the movable member is equal to or higher than the second reference speed.

3. The position detecting apparatus according to claim 1, wherein the first reference speed is defined based on the predetermined cycle at which the signal processor sequentially outputs the plurality of displacement signals by switching the plurality of displacement signals and the cycles of the plurality of pattern arrays.

4. The position detecting apparatus according to claim 1, wherein the first reference speed is defined based on the predetermined cycle at which the signal processor sequentially outputs the plurality of displacement signals by switching the plurality of displacement signals, a length of the scale in the moving direction, and a number of cycles of each of the plurality of pattern arrays.

5. The position detecting apparatus according to claim 2, wherein the second reference speed is defined based on a Nyquist frequency of the predetermined cycle at which the signal processor sequentially outputs the plurality of displacement signals by switching the plurality of displacement signals and the cycle of the pattern array corresponding to a phase signal used by the signal processor in order to generate the second displacement signal.

6. The position detecting apparatus according to claim 1, wherein the absolute position calculator is configured to:
   calculate the position of the movable member based on a third displacement signal among the plurality of displacement signals and a fourth displacement signal having a longer cycle than the third displacement signal when the moving speed of the movable member with respect to the fixed member is lower than a third reference speed; and
   calculate the position of the movable member based on the fourth displacement signal among the plurality of displacement signals and a fifth displacement signal having a longer cycle than the fourth displacement signal when the moving speed of the movable member with respect to the fixed member is equal to or higher than the third reference speed.

7. The position detecting apparatus according to claim 1, wherein the movable member comprises a movable optical member.

8. A lens apparatus comprising a position detecting apparatus which detects a position of a movable member with respect to a fixed member comprising:
   a scale having a plurality of pattern arrays formed of cycles that differ from one another in a moving direction of the movable member;
   a sensor configured to detect a plurality of phase signals based on the scale depending on the position of the movable member with respect to the fixed member;
   a signal processor configured to generate a plurality of displacement signals based on the plurality of phase signals detected by the sensor and sequentially output the generated plurality of displacement signals by switching the plurality of displacement signals at a predetermined cycle;
   a speed detector configured to detect a moving speed of the movable member based on at least one of the plurality of displacement signals;
   an absolute position calculator configured to derive the position of the movable member based on at least two displacement signals among the plurality of displacement signals; and
   a relative position calculator configured to derive a displacement amount with respect to a predetermined position based on a selected displacement signal among the plurality of displacement signals, wherein:
   the position calculated by the absolute position calculator is set as the position of the movable member when the moving speed of the movable member is lower than a first reference speed; and
   the position of the movable member is calculated based on the position of the movable member obtained by the absolute position calculator in advance and the displacement amount with respect to the position calculated by the relative position calculator when the moving speed of the movable member is equal to or higher than the first reference speed,
wherein the movable member comprises a movable optical member, and wherein the movable optical member comprises a zoom lens, a focus lens or an iris.

9. An optical operating apparatus comprising a position apparatus which detects a position of a movable member with respect to a fixed member comprising:
   a scale having a plurality of pattern arrays formed of cycles that differ from one another in a moving direction of the movable member;
   a sensor configured to detect a plurality of phase signals based on the scale depending on the position of the movable member with respect to the fixed member;
   a signal processor configured to generate a plurality of displacement signals based on the plurality of phase signals detected by the sensor and sequentially output the generated plurality of displacement signals by switching the plurality of displacement signals at a predetermined cycle;
   a speed detector configured to detect a moving speed of the movable member based on at least one of the plurality of displacement signals;
   an absolute position calculator configured to derive the position of the movable member based on at least two displacement signals among the plurality of displacement signals; and
   a relative position calculator configured to derive a displacement amount with respect to a predetermined position based on a selected displacement signal among the plurality of displacement signals, wherein:
   the position calculated by the absolute position calculator is set as the position of the movable member when the moving speed of the movable member is lower than a first reference speed; and
   the position of the movable member is calculated based on the position of the movable member obtained by the absolute position calculator in advance and the displacement amount with respect to the position calculated by the relative position calculator when the moving speed of the movable member is equal to or higher than the first reference speed,
wherein the movable member comprises a movable optical member, and an operation unit configured to drive a movable optical member.

10. The optical operating apparatus according to claim 9, wherein the operation unit comprises a zoom operation unit, a focus operation unit, and a flange back adjusting unit.

* * * * *